US012418842B2

(12) United States Patent
Wu et al.

(10) Patent No.: US 12,418,842 B2
(45) Date of Patent: Sep. 16, 2025

(54) METHOD AND APPARATUS FOR PERFORMING MOBILITY ROBUSTNESS OPTIMIZATION IN A HANDOVER PROCEDURE

(71) Applicant: Lenovo (Beijing) Ltd., Beijing (CN)

(72) Inventors: Lianhai Wu, Chaoyang (CN);
Bingchao Liu, Changping District (CN); Jing Han, Chaoyang District (CN); Haiming Wang, Xicheng District (CN); Jie Shi, Haidian District (CN)

(73) Assignee: Lenovo (Beijing) Limited, Beijing (CN)

( * ) Notice: Subject to any disclaimer, the term of this patent is extended or adjusted under 35 U.S.C. 154(b) by 484 days.

(21) Appl. No.: 17/773,564

(22) PCT Filed: Nov. 15, 2019

(86) PCT No.: PCT/CN2019/118835
§ 371 (c)(1),
(2) Date: Apr. 29, 2022

(87) PCT Pub. No.: WO2021/092916
PCT Pub. Date: May 20, 2021

(65) Prior Publication Data
US 2022/0377630 A1 Nov. 24, 2022

(51) Int. Cl.
*H04W 4/00* (2018.01)
*H04W 36/00* (2009.01)
(Continued)

(52) U.S. Cl.
CPC ... *H04W 36/0079* (2018.08); *H04W 36/0058* (2018.08); *H04W 76/19* (2018.02); *H04W 36/362* (2023.05)

(58) Field of Classification Search
CPC ............ H04W 36/0079; H04W 76/19; H04W 36/0058; H04W 36/362; H04W 80/04;
(Continued)

(56) References Cited

U.S. PATENT DOCUMENTS

| 12,250,601 | B2* | 3/2025 | Wang | H04W 36/362 |
| 2011/0117908 | A1* | 5/2011 | Huang | H04W 76/19 |
| | | | | 455/437 |

(Continued)

FOREIGN PATENT DOCUMENTS

| CN | 103179601 A | 6/2013 |
| CN | 103298004 A | 9/2013 |

(Continued)

OTHER PUBLICATIONS

19952546.0 , "Extended European Search Report", EP Application No. 19952546.0, Jun. 30, 2023, 11 pages.

(Continued)

*Primary Examiner* — Phuongchau Ba Nguyen
(74) *Attorney, Agent, or Firm* — FIG. 1 Patents (57) ABSTRACT

The present application is related to a method and apparatus for performing a mobility robustness optimization (MRO) mechanism in a handover procedure of a user equipment (UE). Upon a failure associated with a serving cell of a base station (BS), the UE performs a cell selection procedure to select a cell of a second BS, wherein the failure is one of a radio link failure (RLF), a handover (HO) failure, or a first conditional handover (CHO) failure. The selected cell is associated with a CHO configuration. The UE performs a CHO procedure and, upon a second CHO failure during the CHO procedure, performs a RRC re-establishment procedure. After entering into a connected state with the second BS, the UE transmits, to the second BS, an RLF report that
(Continued)

includes both information related to the failure and information related to the second CHO failure.

19 Claims, 7 Drawing Sheets

(51) Int. Cl.
*H04W 76/19* (2018.01)
*H04W 36/36* (2009.01)

(58) Field of Classification Search
CPC . H04W 36/18; H04W 36/0011; H04W 36/14; H04W 36/08
See application file for complete search history.

(56) References Cited

U.S. PATENT DOCUMENTS

| | | | | |
|---|---|---|---|---|
| 2013/0316713 | A1* | 11/2013 | Xu et al. | H04W 36/324 |
| 2014/0248882 | A1* | 9/2014 | Wang | H04W 24/10 |
| 2014/0378138 | A1* | 12/2014 | Chang | H04W 36/0085 |
| 2015/0036512 | A1 | 2/2015 | Xu et al. | |
| 2015/0092746 | A1* | 4/2015 | Jang | H04W 36/0094 370/331 |
| 2015/0245405 | A1* | 8/2015 | Johansson | H04W 36/0061 370/216 |
| 2016/0285679 | A1 | 9/2016 | Dudda et al. | |
| 2017/0086109 | A1* | 3/2017 | Da Silva | H04W 36/00 |
| 2017/0251409 | A1* | 8/2017 | Wegmann | H04W 76/18 |
| 2019/0223073 | A1* | 7/2019 | Chen | H04W 36/0077 |
| 2020/0351734 | A1* | 11/2020 | Purkayastha | H04W 76/30 |
| 2021/0029600 | A1* | 1/2021 | Balan | H04W 36/0094 |
| 2022/0078686 | A1* | 3/2022 | Yiu | H04W 36/00 |
| 2022/0131793 | A1* | 4/2022 | Ramachandra | H04W 36/305 |
| 2022/0182903 | A1* | 6/2022 | Ishii | H04W 36/0058 |
| 2022/0201582 | A1* | 6/2022 | Eklöf | H04W 24/08 |
| 2022/0286935 | A1* | 9/2022 | Fang | H04W 24/08 |
| 2022/0386197 | A1* | 12/2022 | Hwang | H04W 36/362 |

FOREIGN PATENT DOCUMENTS

| | | | |
|---|---|---|---|
| CN | 107113673 A | 8/2017 | |
| CN | 109392039 A | 2/2019 | |
| WO | 2013024574 A1 | 2/2013 | |
| WO | 2019096396 A1 | 5/2019 | |
| WO | 2019154480 A1 | 8/2019 | |
| WO | WO-2024097295 A1 * | 5/2024 | H04L 5/001 |

OTHER PUBLICATIONS

Ericsson , "Remaining open issues for CHO", 3GPP TSG-RAN WG2 #108, R2-1914634, Reno, Nevada [retrieved Aug. 30, 2023]. Retrieved from the Internet <https://www.3gpp.org/ftp/tsg_ran/WG2_RL2/TSGR2_108/Docs>, Nov. 2019, 14 pages.

Nokia , et al., "On RLF reporting for CHO and DAPS", 3GPP TSG-RAN WG2 Meeting #108, R2-1915497, Reno, USA [retrieved Aug. 30, 2023]. Retrieved from the Internet <https://www.3gpp.org/ftp/tsg_ran/WG2_RL2/TSGR2_108/Docs>, Nov. 2019, 3 pages.

"International Search Report and Written Opinion", PCT Application No. PCT/CN2019/118835, Aug. 7, 2020, 8 pages.

Asustek , "Discussion on DL signals and channels", 3GPP TSG RAN WG1 #99, R1-1913057, Reno, NV, USA [retrieved Jun. 9, 2022]. Retrieved from the Internet <https://www.3gpp.org/ftp/Meetings_3GPP_SYNC/RAN1/Docs/?sortby=sizerev>., Nov. 2019, 5 pages.

NEC , "RLF report for CHO", 3GPP TSG-RAN WG2 #107, R2-1909660, Prague, Czech Republic [retrieved Jun. 9, 2022]. Retrieved from the Internet <https://www.3gpp.org/ftp/tsg_ran/WG2_RL2/TSGR2_107/Docs>., Aug. 2019, 3 pages.

NEC , "RLF report for CHO", 3GPP TSG-RAN WG2 #108, R2-1915454, Reno, USA, Nov. 2019, 3 pages.

PCT/CN2019/118835 , "International Preliminary Report on Patentability", PCT Application No. PCT/CN2019/118835, May 27, 2022, 6 pages.

"Foreign Office Action", EP Application No. 19952546.0, Jul. 7, 2025.

* cited by examiner

| IE/Group Name | Presence | Range | IE type and reference | Semantics description | Criticality | Assigned criticality |
|---|---|---|---|---|---|---|
| Message Type | M | | 9.2.13 | | YES | ignore |
| Failure cell PCI | M | | INTEGER (0..503, ...) | Physical Cell Identifier | YES | ignore |
| Re-establishment cell ECGI | M | | ECGI 9.2.14 | | YES | ignore |
| C-RNTI | M | | BIT STRING (SIZE (16)) | C-RNTI contained in the RRC Re-establishment Request message (TS36.331 [9]) | YES | ignore |
| ShortMAC-I | O | | BIT STRING (SIZE (16)) | ShortMAC-I contained in the RRC Re-establishment Request message (TS36.331 [9]) | YES | ignore |
| UE RLF Report Container | O | | OCTET STRING | *RLF -Report-r9* IE contained in the UE Information Response message (TS36.331 [9]) | YES | ignore |
| RRC Conn Setup Indicator | O | | ENUMERATED (RRC Conn Setup, ...) | Included if the RLF Report within the *UE RLF Report Container* IE is retrieved after an RRC connection setup or an incoming successful handover | YES | reject |
| RRC Conn Reestab Indicator | O | | ENUMERATED (reconfiguration Failure, HO Failure, other Failure, ...) | The Reestablishment Cause in RRC Connection Reestablishment Request message(TS36.331 [9]) | YES | ignore |
| UE RLF Report Container for extended bands | O | | OCTET STRING | *RLF-Report-v9e0* IE contained in the UE Information Response message (TS36.331 [9]) | YES | ignore |

FIG. 6

| IE/Group Name | Presence | Range | IE type and reference | Semantics description | Criticality | Assigned criticality |
|---|---|---|---|---|---|---|
| Message Type | M | | 9.2.13 | | YES | ignore |
| Failure cell PCI | M | | INTEGER (0..503, ...) | Physical Cell Identifier | YES | ignore |
| Re-establishment cell ECGI | M | | ECGI 9.2.14 | | YES | ignore |
| C-RNTI | M | | BIT STRING (SIZE (16)) | C-RNTI contained in the RRC Re-establishment Request message (TS36.331 [9]) | YES | ignore |
| ShortMAC-I | O | | BIT STRING (SIZE (16)) | ShortMAC-I contained in the RRC Re-establishment Request message (TS36.331 [9]) | YES | ignore |
| UE RLF Report Container | O | | OCTET STRING | *RLF-Report-r9* IE contained in the UE Information Response message (TS36.331 [9]) | YES | ignore |
| RRC Conn Setup Indicator | O | | ENUMERATED (RRC Conn Setup, ...) | Included if the RLF Report within the *UE RLF Report Container* IE is retrieved after an RRC connection setup or an incoming successful handover | YES | reject |
| RRC Conn Reestab Indicator | O | | ENUMERATED (reconfiguration Failure, HO Failure, other Failure, CHO failure...) | The Reestablishment Cause in RRC Connection Reestablishment Request message(TS36.331 [9]) | YES | ignore |
| CHO cell ID for failure recovery | O | | INTEGER (0..503, ...) | | YES | ignore |
| UE RLF Report Container for extended bands | O | | OCTET STRING | *RLF-Report-v9e0* IE contained in the UE Information Response message (TS36.331 [9]) | YES | ignore |

FIG. 7

| IE/Group Name | Prese nce | Ra nge | IE type and reference | Semantics description | Criti cality | Assigned criticality |
|---|---|---|---|---|---|---|
| Message Type | M | | 9.2.13 | | YES | ignore |
| Failure cell PCI | M | | INTEGER (0..503, ...) | Physical Cell Identifier | YES | ignore |
| Re-establishment cell ECGI | M | | ECGI 9.2.14 | | YES | ignore |
| C-RNTI | M | | BIT STRING (SIZE (16)) | C-RNTI contained in the RRC Re-establishment Request message (TS36.331 [9]) | YES | ignore |
| ShortMAC-I | O | | BIT STRING (SIZE (16)) | ShortMAC-I contained in the RRC Re-establishment Request message (TS36.331 [9]) | YES | ignore |
| UE RLF Report Container | O | | OCTET STRING | *RLF -Report-r9* IE contained in the UE Information Response message (TS36.331 [9]) | YES | ignore |
| RRC Conn Setup Indicator | O | | ENUMERATED (RRC Conn Setup, ...) | Included if the RLF Report within the *UE RLF Report Container* IE is retrieved after an RRC connection setup or an incoming successful handover | YES | reject |
| RRC Conn Reestab Indicator | O | | ENUMERATED (reconfiguration Failure, HO Failure, other Failure, ...) | The Reestablishment Cause in RRC Connection Reestablishment Request message(TS36.331 [9]) | YES | ignore |
| Conditional HO indicator | O | | ENUMERATE D (CHO, ...) | | YES | ignore |
| CHO cause | O | | ENUMERATE D (reconfiguration Failure, HO Failure, RLF, CHO failure, ...) | | YES | ignore |
| UE RLF Report Container for extended bands | O | | OCTET STRING | *RLF-Report-v9e0* IE contained in the UE Information Response message (TS36.331 [9]) | YES | ignore |

FIG. 8

METHOD AND APPARATUS FOR PERFORMING MOBILITY ROBUSTNESS OPTIMIZATION IN A HANDOVER PROCEDURE

TECHNICAL FIELD

Embodiments of the present application generally relate to wireless communication technology, in particular to solutions for performing a mobility robustness optimization (MRO) mechanism in a handover procedure of a user equipment (UE) supporting 3rd Generation Partnership Project (3GPP) 5G new radio (NR).

BACKGROUND

A base station (BS) can have some cells (or areas) to provide communication service. In 3GPP Release 17, when a UE needs to handover from a serving cell of a source base station (BS) to a target cell of a target BS, a handover procedure (e.g. a failure handling mechanism, a conditional handover (CHO) procedure, etc.) and a cell selection procedure before the handover procedure are performed.

3GPP 5G NR adopts a MRO mechanism. However, details of the MRO mechanism in a handover procedure have not been discussed in 3GPP 5G NR technology yet.

SUMMARY

Some embodiments of the present application provide a method for wireless communication performed by a user equipment (UE). The method includes: upon a failure associated with a serving cell of a BS, performing a cell selection procedure to select a cell of another BS, wherein the failure is one of a radio link failure (RLF), a handover (HO) failure, and a conditional handover (CHO) failure; if the selected cell of the abovementioned another BS is not associated with the CHO configuration, performing a radio resource control (RRC) re-establishment procedure; if the selected cell of the abovementioned another BS is associated with the CHO configuration, performing a CHO procedure; upon another CHO failure during the CHO procedure, performing a RRC re-establishment procedure; and after entering into a connected state with the abovementioned another BS, transmitting a RLF report to the abovementioned another BS, wherein the RLF report includes both information related to the failure and information related to the abovementioned another CHO failure.

Some embodiments of the present application provide an apparatus for wireless communications. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the abovementioned method performed by a UE.

Some embodiments of the present application provide a method for wireless communication performed by a base station (BS). The method includes: receiving a RLF report from a UE, wherein the RLF report includes information related to a CHO failure; and transmitting a failure indication message to another BS.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the abovementioned method performed by a BS.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
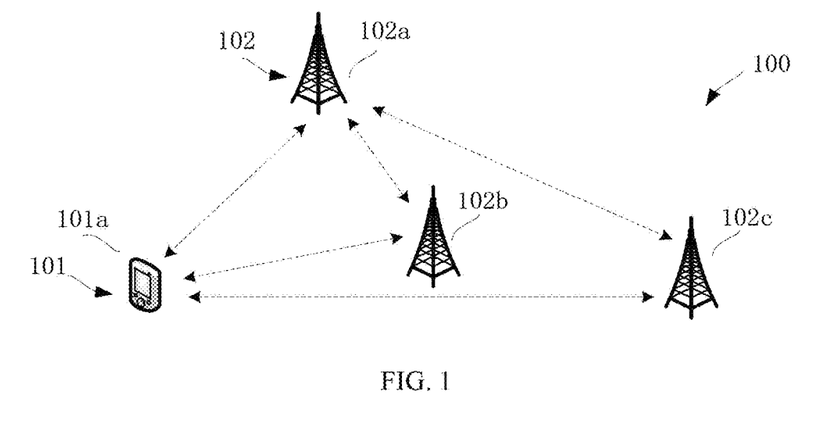
FIG. 1 illustrates a schematic diagram of a wireless communication system in accordance with some embodiments of the present application.

FIG. 1 illustrates a schematic diagram of a wireless communication system in accordance with some embodiments of the present application.

As illustrated and shown in FIG. 1, a wireless communication system 100 includes at least one user equipment (UE) 101 and at least one base station (BS) 102. In particular, the wireless communication system 100 includes one UE 101 (e.g., UE 101a) and three BSs 102 (e.g., BS 102a, BS 102b, and BS 102c) for illustrative purpose. Although a specific number of UEs 101 and BSs 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via uplink (UL) communication signals.

In some embodiments of the present application, each of the UE(s) 101 may be deployed an IoT application, an eMBB application and/or an URLLC application. It is contemplated that the specific type of application(s) deployed in the UE(s) 101 may be varied and not limited.

The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a NG-RAN (Next Generation-Radio Access Network) node, a Home Node-B, a relay node, or a device, or described using other terminology used in the art. The BS(s) 102 is generally a part of a radio access network that may include one or more controllers communicably coupled to one or more corresponding BS(s) 102. BS(s) 102 may communicate directly with each other. For example, BS(s) 102 may communicate directly with each other via Xn interface or X2 interface.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) 102 transmit data using an OFDM modulation scheme on the DL and the UE(s) 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of present application, the BS(s) 102 may communicate with the UE(s) 101 using the 3GPP 5G protocols.

Each BS(s) 102 may include one or more cells. Each UE(s) 101 may perform a cell section procedure between different cell(s) of different BS(s). Each UE(s) 101 may handover from a serving cell of a source BS to a target cell of a target BS. For example, in the wireless communication system 100 as illustrated and shown in FIG. 1, BS 102a may function as a source BS, and each of BS 102b and BS 102c may function as a target BS. If there is a handover need, UE 101a as illustrated and shown in FIG. 1 may perform a handover procedure from a serving cell of BS 102a to a target cell of BS 102b or a target cell of BS 102c, which depends a result of a cell selection procedure. The handover procedure performed by UE 101a may be a CHO procedure.

In 3GPP 5G NR technology, a MRO mechanism is adopted. One function of a MRO mechanism is monitoring whether a connection failure occurs due to a too early handover scenario, a too late handover scenario, or a scenario of handover to a wrong cell. A MRO mechanism may provide means to distinguish the above three failure scenarios from LTE coverage related problems and other problems which are not related to mobility of a network. A MRO mechanism may optimize a mobility of a network by using reported information related to failure scenario(s). Solutions for the above three failure scenarios include at least one of the following two functions. Triggering of each of these two functions is optional and depends on an actual situation and implementation.

Function (1): Detection of a failure after a RRC re-establishment.

Function (2): Detection of a failure after a RRC connection setup.

Details of the above three failure events and the corresponding failure detection mechanisms are described as follows. The expression "successful handover" in these failure events refers to a UE's state, i.e., a successful completion of a radio access (RA) procedure.

[Too Late Handover]

In a too late handover scenario, a UE attempts to re-establish a radio link connection in a target cell of a target BS, but the UE stays for a long period of time in a serving cell of a source BS; and due to this reasons, a radio link failure (RLF) occurs.

In particular, if a UE is located in a serving cell that belongs to BS A, and the UE attempts to re-establish a radio link connection in a cell that belongs to BS B (which is different from BS A), BS B may report "a Too Late Handover event" to BS A by a RLF INDICATION message. Then, BS A may use information in the RLF INDICATION message to determine whether a failure occurred in the serving cell of BS A.

[Too Early Handover]

In a too early handover scenario, when a UE attempts to re-establish a radio link connection in a source cell of a source BS, a RLF occurs shortly after the UE's successful handover procedure from the source cell to a target cell of a target BS, or a handover failure occurs during the UE's handover procedure from the source cell to a target cell of a target BS.

For instance, if a target cell belongs to BS B and BS B is different from BS A that controls a source cell, BS B may send a HANDOVER REPORT message to indicate "a Too Early Handover event" to BS A, in the case that BS B receives a RLF INDICATION message from BS A and BS B has sent a UE CONTEXT RELEASE message to BS A related to a completion of an incoming handover procedure for the same UE within a period of time (e.g., a plurality of seconds) or there exists a prepared handover procedure for the same UE in BS B.

[Handover to Wrong Cell]

In a scenario of handover to a wrong cell, a UE attempts to re-establish a radio link connection in a different cell other than a source cell and a target cell, while a RLF occurs shortly after the UE's successful handover procedure from the source cell to the target cell, or a handover (HO) failure occurs during the UE's handover procedure from the source cell to the target cell. In short, the UE aims to handover to a cell different from both a source cell and a target cell, but does not aim to handover from the source cell to the target cell.

For instance, if a failure which occurs in the scenario of handover to a wrong cell is a RLF and a target cell belongs to BS B (which is different from BS A that controls a source cell), BS B may send a HANDOVER REPORT message indicating "a Handover To Wrong Cell event" to BS A, in the case that BS B receives a RLF INDICATION message from BS C, and if BS B has sent the UE CONTEXT RELEASE message to BS A related to the completion of an incoming handover for the same UE within a period of time (e.g., a plurality of seconds) or there exists a prepared handover for the same UE in BS B. This scenario also applies when BS A and BS C are the same BS. The HANDOVER REPORT message may also be sent if BS B and BS C are the same BS and the RLF INDICATION message is internal to this BS.

Alternatively, if a failure which occurs in the scenario of handover to a wrong cell is a HO failure during a handover from a cell in BS A and a UE attempts to re-establish a radio link connection to a cell in BS C, BS C may send a RLF INDICATION message to BS A.

Currently, under 3GPP 5G NR, after a RLF or a HO failure occurs, a general procedure is that a UE accesses a new cell of a BS by a RRC re-establishment or a RRC connection setup. Once the UE enters into a connected state with a new cell of a BS, (upon entering into the connected state, a new cell of a BS is called as a serving cell of a BS for the UE), the UE transmits a RLF report and a random access channel (RACH) report to the serving cell of the BS. The serving cell of the BS will transmit a RLF INDICA-TION message including the RLF report to the original serving cell of the original BS (i.e., the source cell of the source BS). Finally, information received by the original serving cell of the original BS is used to optimize a mobility of the network via a MRO mechanism.

Specifically, in a CHO topic of 3GPP Release 17, workgroup RAN2 has agreed a new recovery procedure for a RLF, a HO failure, or a CHO failure in RAN2 #107bis:

Upon an occurrence of a RLF, a HO failure, or a CHO failure, a UE performs a cell selection procedure. If the selected cell is a CHO candidate cell, the UE attempts to execute a CHO procedure; otherwise, the UE performs a RRC re-establishment.

Once a CHO failure occurs during a CHO procedure performed for a failure handling procedure, a UE will perform a RRC re-establishment. That is, only one attempt of a CHO procedure during a failure case is allowed, but multiple attempts of a CHO procedure during a failure case are not allowed.

If a UE doesn't support a CHO procedure, the UE directly performs a RRC re-establishment. A network or a BS can configure behaviors and capabilities of a UE.

According to the above agreements in 3GPP workgroup RAN2, when a RLF, a HO failure, or a CHO failure occurs (this process may be named as Round #1), a UE may perform a CHO procedure (this process may be named as Round #2) if the selected cell is a CHO candidate cell. If another CHO failure occurs during the CHO procedure in Round #2, the UE will perform a RRC re-establishment (this process may be named as Round #3). In legacy, there is no procedure for failure recovery when another CHO failure occurs during the CHO procedure in Round #2. Accordingly, problems of how to perform a failure recovery procedure and what information should be transmitted during or after a CHO procedure in Round #2 need to be solved. In addition, if a CHO procedure in Round #2 is successfully completed, a problem of whether a UE should report a UE information response also needs to be solved.

Embodiments of the present application aim to provide solutions for performing a CHO procedure for failure recovery in response to an occurrence of a failure in Round #1. Some embodiments of the present application report the corresponding information in response to a successful completion of a CHO procedure in Round #2. Some embodiments of the present application define new information elements (IE(s)) in a message transmitted to a BS. More details for embodiments of the present application will be illustrated in the following text in combination with the appended drawings.

In the following descriptions, BS 1 represents a source BS which controls the original serving cell of a UE. BS 1 may also be named as a source BS or BS A. BS 2 represents a target BS or a new BS which controls a target cell of the UE. That is, BS 2 controls the current serving cell of the UE, after completing the UE's handover procedure from the original serving cell to the current serving cell. BS 2 may also be named as a target BS or BS B. In some cases, BS 1 and BS 2 are the same BS. In some cases, BS 1 and BS 2 are different BSs.

More specifically, there may be the following three scenarios within a MRO mechanism.

Scenario A

One use case in Scenario A is: one of a RLF, a HO failure, and a CHO failure occurs in Round #1; then, a CHO failure occurs in Round #2; and after that, a RRC re-establishment is successfully completed.

Under Scenario A, the following problems need to be solved: (1) how a MRO mechanism detects a failure after the RRC re-establishment; what additional assistant information should be transmitted between two BSs (i.e., BS 1 and BS 2); and what additional assistant information should be transmitted by the UE.

Scenario B

One use case in Scenario B is: one of a RLF, a HO failure, and a CHO failure occurs in Round #1; then, another failure occurs in a RRC re-establishment procedure; and after that, a UE enters into an idle state in response to the abovementioned another failure in the RRC re-establishment procedure.

Another use case in Scenario B is: one of a RLF, a HO failure, and a CHO failure occurs in Round #1; then, a CHO failure occurs in Round #2; after that, another failure occurs in a RRC re-establishment procedure; and finally, a UE enters into an idle state in response to the abovementioned another failure in the RRC re-establishment procedure.

Under Scenario B, a problem of what additional assistant information should transmitted by the UE needs to be solved.

Scenario C

One use case in Scenario C is: one of a RLF, a HO failure, and a CHO failure occurs in Round #1; and then, a CHO procedure in Round #2 is successfully completed.

Under Scenario C, a problem of what additional assistant information should be transmitted between two BSs (i.e., BS 1 and BS 2) needs to be solved.

Some embodiments of the present application aim to provide solutions for three failure events [Too Late Handover], [Too Early Handover], and [Handover to Wrong Cell] under Scenarios A, B, and C. Details are described as below.

Figure 2:
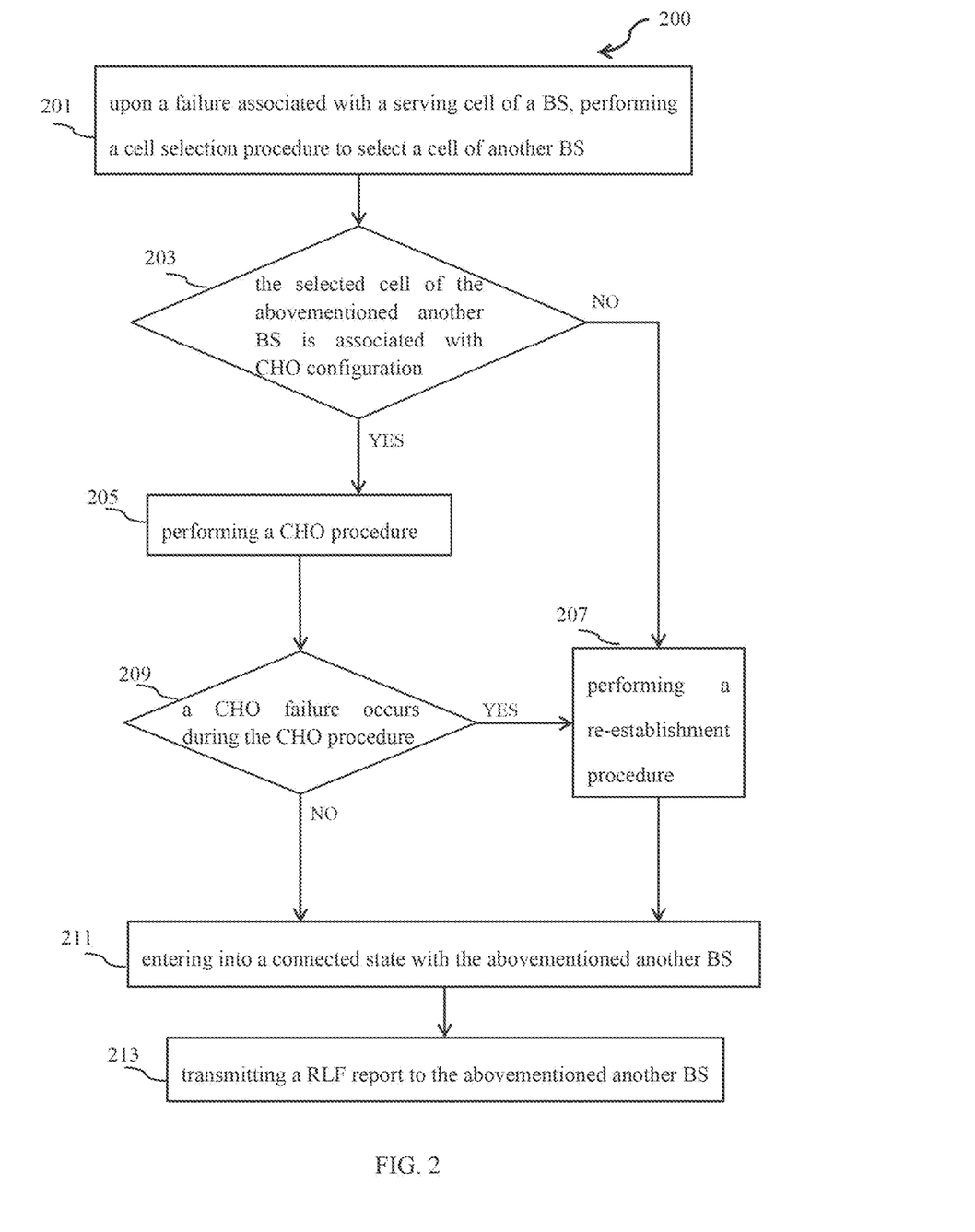
FIG. 2 illustrates a flow chart of a method for wireless communication in accordance with some embodiments of the present application.

FIG. 2 illustrates a flow chart of a method for wireless communication in accordance with some embodiments of the present application. The exemplary method 200 as illustrated and shown in FIG. 2 is performed by a UE which aims to handover from the serving cell of BS 1 to a cell of BS 2.

In the exemplary method 200, in operation 201, a UE (e.g., UE 101*a* as illustrated and shown in FIG. 1), upon a failure associated with a serving cell of a BS (e.g., BS 1), performs a cell selection procedure to select a cell of another BS (e.g., BS 2). The failure associated with the serving cell of the BS is one of a RLF, a HO failure, and a CHO failure. The abovementioned another BS is a target BS or anew BS which controls a target cell of the UE. In some cases, the abovementioned another BS and the BS are the same BS. That is, the serving cell and the selected cell belong to the same BS.

In operation 203, the UE determines whether the selected cell of the abovementioned another BS is associated with CHO configuration. In response to the selected cell of the abovementioned another BS being associated with the CHO configuration, the UE performs a CHO procedure as illustrated and shown in operation 205. The UE may access the selected cell after completing the CHO procedure. In response to the selected cell of the abovementioned another BS being not associated with the CHO configuration, the UE performs a RRC re-establishment procedure as illustrated and shown in operation 207. The UE may access the selected cell after completing the RRC re-establishment procedure.

In operation 209, the UE determines whether a CHO failure occurs during the CHO procedure in operation 205. In response to an occurrence of a CHO failure during the CHO procedure, the UE performs a RRC re-establishment procedure as illustrated and shown in operation 207. In response to no occurrence of a CHO failure during the CHO procedure, the UE enters into a connected state with the abovementioned another BS as illustrated and shown in operation 211.

After the UE performing a RRC re-establishment procedure in operation 207, the UE enters into a connected state with the abovementioned another BS as illustrated and shown in operation 211.

In operation 213, the UE transmits a RLF report to the abovementioned another BS. The RLF report includes both information related to the failure in operation 201 and information related to the CHO failure which occurs during the CHO procedure in operation 205.

In some embodiments of the present application, the RLF report comprises an indication whether the failure in operation 201 is due to a RLF failure, a HO failure, or a CHO failure. In some embodiments of the present application, a failure indication message associated with the RLF report may be transmitted from BS 2 to BS 1. For instance, the failure indication message includes a container of the RLF report.

In some embodiments of the present application, prior to an occurrence of a failure in Round #1, the UE performs a CHO procedure in the serving cell of the BS (e.g., BS 1); and then a CHO failure occurs during or after the CHO procedure. That is, in this case, the failure in operation 201 is a CHO failure.

In some embodiments of the present application, if the failure in operation 201 is a CHO failure, the information, which is included in the RLF report and related to the CHO failure in operation 201, comprises at least one of the following five items:

(1) A cell identifier (ID) of the serving cell of the BS (e.g., BS 1).
(2) Information of CHO execution condition.
  In some embodiments of the present application, the information of CHO execution condition comprises at least one of the following four types of information:
  (a) A channel quality of the target cell associated with the failure in operation 201. The channel quality is at least one of reference signal received power (RSRP) and reference signal received quality (RSRQ).
  (b) A channel quality of the serving cell associated with the failure in operation 201.
  (c) An offset between the channel quality of the serving cell and the channel quality of the target cell. If the target cell becomes offset better than the serving cell, the CHO procedure will be executed.
  (d) A first threshold associated with the serving cell and a second threshold associated with the target cell. For example, if the serving cell becomes worse than the first threshold and the target cell becomes better than the second threshold, the CHO procedure will be executed.
(3) A beam ID of a selected beam of a target cell associated with the failure in operation 201. The selected beam of the target cell is used for random access. The beam ID is a synchronization signal block (SSB) index or a channel state information reference signal (CSI RS) index.
(4) A beam quality of the selected beam of the target cell.
(5) A failure type of the failure in operation 201. The failure type of the failure in operation 201 is one of a RLF failure type, a HO failure type, and a CHO failure type. In response to the failure in operation 201 being a CHO failure, the failure type of the failure is a CHO failure type.

In some embodiments of the present application, if another CHO failure occurs during the CHO procedure in operation 205, the information, which is included in the RLF report and related to the abovementioned another CHO failure (that occurs during the CHO procedure in operation 201), comprises at least one of the following six items:

(1) A cell ID of the selected cell of the abovementioned another BS (e.g., BS 2). The cell ID of the selected cell is one of a physical cell identifier (PCI) and an evolved universal terrestrial radio access (E-UTRAN) network cell global identifier (ECGI).

(2) A channel quality of the target cell associated with the abovementioned another CHO failure.

(3) A beam ID of a selected beam of a target cell associated with the abovementioned another CHO failure. The selected beam of the target cell is used for access random.

(4) A beam quality of the selected beam of the target cell.

(5) An execution condition indicator of the CHO procedure in operation 205. The execution condition indicator indicates whether execution condition(s) of the CHO procedure in operation 205 is met or not.

(6) A total number of preambles sent associated with the CHO procedure in operation 205.

In some embodiments of the present application, in the exemplary method 200 as illustrated and shown in FIG. 2, the UE further transmits, to BS 2, an indication indicating the RLF report available, receives an information request from BS 2, and transmits an information response to BS 2. The information response includes the RLF report. The information response may further comprise a RACH report.

In some embodiments of the present application, in the exemplary method 200 as illustrated and shown in FIG. 2, upon successfully accessing the selected cell of BS 2, the UE enters into the connected state with BS 2.

In some embodiments of the present application, in the exemplary method 200 as illustrated and shown in FIG. 2, the UE enters into an idle state in response to another failure in the RRC re-establishment procedure; the UE accesses a cell of an additional BS (e.g., BS 3) from the idle state after a duration; and, upon successfully accessing the cell of the additional BS, the UE enters into the connected state with the additional BS. The idle state may be RRC_IDLE state that is specified in 3GPP TS38.331. In some cases, the cell of the additional BS is the same as the selected cell of BS 2.

Figure 3:
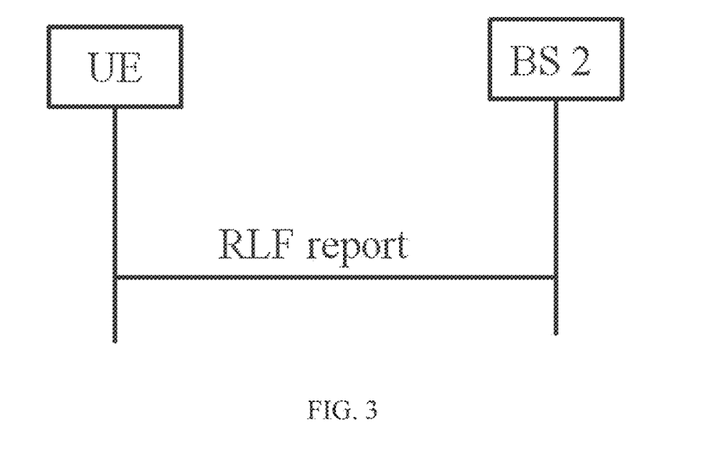
FIG. 3 illustrates an exemplary signal transmission procedure in accordance with some embodiments of the present application.

FIG. 3 illustrates an exemplary signal transmission procedure in accordance with some embodiments of the present application. The embodiments of FIG. 3 show the signal transmission procedure that is performed in the operation 213 of the exemplary method 200 as illustrated and shown in FIG. 2.

As shown in FIG. 3, a UE (e.g., UE 101a as illustrated and shown in FIG. 1) transmits a RLF report to BS 2. BS 2 is a target BS which controls a target cell of the UE, and corresponds to the abovementioned another BS in the embodiments of FIG. 2.

For example, the RLF report transmitted in the embodiments of FIG. 3 may comprise an indication, to indicate whether the failure in operation 201 of the exemplary method 200 as illustrated and shown in FIG. 2 is due to a RLF failure, a HO failure, or a CHO failure.

More specifically, for example, when a [Too Late Handover] event happens in some embodiments of the present application, if a RLF, a HO failure, or a CHO failure occurs in Round #1, a UE performs a cell selection procedure. If the selected cell is configured with CHO configuration information or the selected cell is a CHO candidate cell, the UE attempts to execute a CHO procedure to access BS 2. If CHO procedure is successfully completed, the UE indicates to BS 2 that UE information is available. That is to say, the UE makes the RLF report available to BS 2. Then, BS 2 transmits UE Information Request to the UE. After receiving UE Information Request from BS 2, the UE transmits UE Information Response to BS 2. For example, the UE Information Response includes at least one of a RLF report and a RACH report. Contents of these embodiments are applicable for any of Scenario A, Scenario B, and Scenario C.

The UE Information Response in the abovementioned embodiments may include legacy information and new information. In some embodiments of the present application, new information in the UE Information Response may include at least one of the following four groups of parameters:

Group #1 Parameter for CHO Failure Cell ID (May be Used for Round #1):
  CHO failure Cell ID: PCI of the cell in which the UE perform a CHO procedure prior to an occurrence of the failure in Round #1
  Information of CHO execution condition.
    (a) A channel quality of the target cell associated with a failure in Round #1. The channel quality is RSRP or RSRQ.
    (b) A channel quality of a serving cell associated with the failure in Round #1.
    (c) An offset between the channel quality of the serving cell and the channel quality of the target cell. If the target cell becomes offset better than the serving cell, the CHO procedure will be executed.
    (d) A first threshold associated with the serving cell and a second threshold associated with the target cell. For example, if the serving cell becomes worse than the first threshold and the target cell becomes better than the second threshold, the CHO procedure will be executed.
  Beam quality of the selected beam of CHO failure cell ID Group #2 Parameter (May be Used for Round #2):
  CHO failure cell ID for failure recovery: PCI of the cell in which the UE perform a CHO procedure after the failure occurring in Round #1
  Information of CHO execution condition.
    (a) A channel quality of the target cell associated with a failure in Round #1. The channel quality is RSRP or RSRQ.
    (b) A channel quality of a serving cell associated with the failure in Round #1.
    (c) An offset between the channel quality of the serving cell and the channel quality of the target cell. If the target cell becomes offset better than the serving cell, the CHO procedure will be executed.
    (d) A first threshold associated with the serving cell and a second threshold associated with the target cell. For example, if the serving cell becomes worse than the first threshold and the target cell becomes better than the second threshold, the CHO procedure will be executed.
  Beam quality of the selected beam of CHO failure cell ID
  CHO execution condition indicator, which is used to indicate whether CHO execution condition is met or not when the UE performs a CHO procedure for failure recovery Group #3 Parameter (May be Used for Round #1):
Connection Failure Type, which includes three options: RLF, HOF, and CHOF Group #4 Parameter (May be Used for Round #2):
Number Of Preambles Sent in CHO recovery, to indicate the number of preambles sent by medium access control (MAC) layer for the failed random access procedure in a CHO procedure for failure recovery in Round #2

Beam ID of a selected beam of a target cell associated with a failure in Round #1. The selected beam of the target cell is used for random access.

Figure 4:
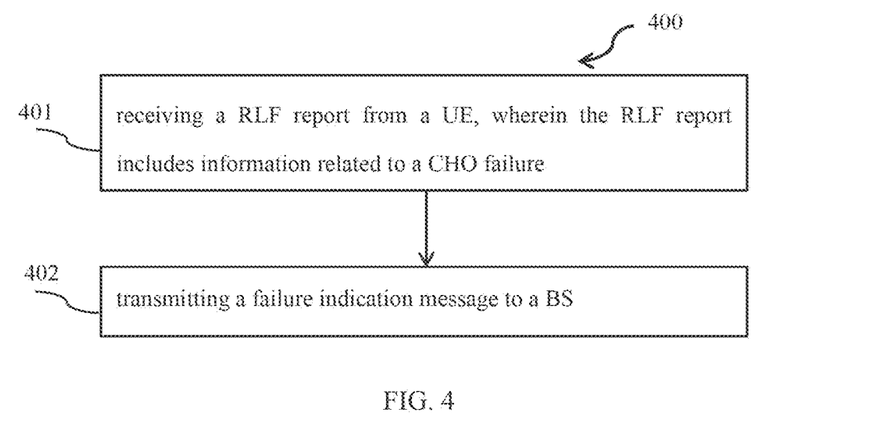
FIG. 4 illustrates another flow chart of a method for wireless communication in accordance with some embodiments of the present application.

FIG. 4 illustrates another flow chart of a method for wireless communication in accordance with some embodiments of the present application. The exemplary method 400 as illustrated and shown in FIG. 4 is performed by BS 2, which controls the current serving cell of a UE after completing the UE's handover procedure from the original serving cell to the current serving cell.

In the exemplary method 400, in operation 401, a BS (e.g., one of BS 102a, BS 102b, and BS 102c as illustrated and shown in FIG. 1), receives a RLF report from a UE (e.g., UE 101a as illustrated and shown in FIG. 1), wherein the RLF report includes information related to a CHO failure. In operation 402, the BS transmits a failure indication message to another BS (e.g., another one of BS 102a, BS 102b, and BS 102c as illustrated and shown in FIG. 1).

In some embodiments of the present application, the failure indication message includes a container of the RLF report received in operation 401 of the exemplary method 400 as illustrated and shown in FIG. 4.

Figure 5:
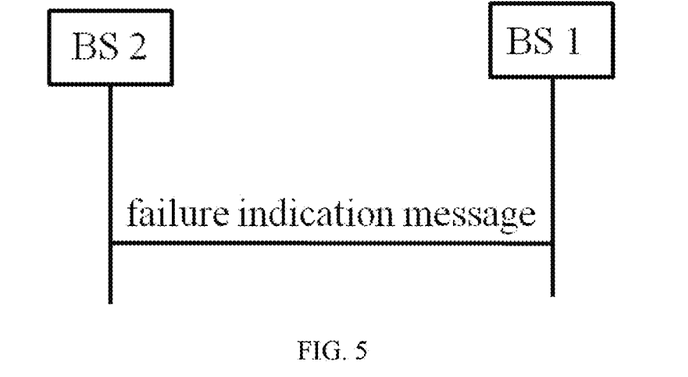
FIG. 5 illustrates a further exemplary signal transmission procedure in accordance with some embodiments of the present application.

FIG. 5 illustrates a further exemplary signal transmission procedure in accordance with some embodiments of the present application. The embodiments of FIG. 5 show the signal transmission procedure that is performed in the operation 402 of the exemplary method 400 as illustrated and shown in FIG. 4.

As shown in FIG. 5, BS 2 transmits a failure indication message to BS 1. BS 1 is a source BS which controls the original serving cell of a UE (e.g., UE 101a as illustrated and shown in FIG. 1). BS 2 is a target BS or a new BS which controls a target cell of the UE, which corresponds to the abovementioned another BS in the embodiments of FIG. 2. The failure indication message may be transmitted by Xn interface or X2 interface.

The failure indication message transmitted from BS 2 to BS 1 is associated with the RLF report which is received from the UE in operation 401 of the exemplary method 400 as illustrated and shown in FIG. 4. For example, the failure indication message includes a container of the RLF report. The container of the RLF report may be transmitted by Xn interface or X2 interface.

In some embodiments of the present application, the failure indication message includes a CHO cell ID for failure recovery, and the CHO cell ID represents an identifier of a cell in which the CHO failure occurs. For example, the CHO cell ID is a physical cell identifier (PCI) of the cell. The CHO cell ID may be used to indicate to BS 1 that a CHO procedure for failure recovery is performed in the cell before a RRC re-establishment.

In some embodiments of the present application, the failure indication message includes a new information element (IE) of a CHO indicator, and the CHO indicator indicates that a CHO procedure for failure recovery is successful. The failure indication message may be a RLF INDICATION message.

For instance, when a [Too Late Handover] event happens in some embodiments of the present application, if a CHO failure occurs in Round #1 in a cell of BS 1, the following steps are performed in two use cases in Scenario B below:

Case 1: a CHO failure occurs (Round #1); then, a CHO failure occurs in a CHO procedure (Round #2); after that, a RRC re-establishment failed (Round #3); and finally, the UE enters into an idle state.

Case 2: a CHO failure occurs (Round #1); then, a RRC re-establishment failed (Round #3); and after that, the UE enters into an idle state.

In particular, in the embodiments of Case 1 and Case 2, if a UE fails to complete a RRC re-establishment, the UE enters into an idle mode from a connected mode. Then, the UE may access BS 2 from the idle mode to the connected mode after a period of time (e.g., a plurality of seconds). Upon entering into the connected mode, the UE may transmit UE information to BS 2. The UE information may include at least one of a RLF report and a RACH report. After that, BS 2 may transmit a failure indication message to BS 1.

The failure indication message may include an indication to indicate that whether a connection failure in Round #1 in the cell of BS 1 was due to a RLF, a HO failure or a CHO failure. Since a CHO failure occurs in Round #1 in the cell of BS 1 in these embodiments, the RLF indication message transmitted by BS 2 will include an indication to indicate that the connection failure in Round #1 in the cell of BS 1 was due to a CHO failure.

In some embodiments of the present application, similar to the UE Information Response, the failure indication message may include at least one of the following four groups of parameters:

Group #1 Parameter for CHO Failure Cell ID (May be Used for Round #1):
CHO failure Cell ID: ECGI of the cell in which the UE perform a CHO procedure prior to an occurrence of the failure in Round #1.

Information of CHO execution condition.
(a) A channel quality of the target cell associated with a failure in Round #1. The channel quality is RSRP or RSRQ.
(b) A channel quality of a serving cell associated with the failure in Round #1.
(c) An offset between the channel quality of the serving cell and the channel quality of the target cell. If the target cell becomes offset better than the serving cell, the CHO procedure will be executed.
(d) A first threshold associated with the serving cell and a second threshold associated with the target cell. For example, if the serving cell becomes worse than the first threshold and the target cell becomes better than the second threshold, the CHO procedure will be executed.

Beam quality of the selected beam of CHO failure cell ID

Group #2 Parameter (May be Used for Round #2):
CHO failure cell ID for failure recovery: ECGI of the cell in which the UE perform a CHO procedure after the failure occurring in Round #1.

Information of CHO execution condition.
(a) A channel quality of the target cell associated with a failure in Round #1. The channel quality is RSRP or RSRQ.
(b) A channel quality of a serving cell associated with the failure in Round #1.
(c) An offset between the channel quality of the serving cell and the channel quality of the target cell. If the target cell becomes offset better than the serving cell, the CHO procedure will be executed.
(d) A first threshold associated with the serving cell and a second threshold associated with the target cell. For example, if the serving cell becomes worse than the first threshold and the target cell becomes better than the second threshold, the CHO procedure will be executed.

Beam quality of the selected beam of CHO failure cell ID

CHO execution condition indicator, which is used to indicate whether CHO execution condition is met or not when the UE performs a CHO procedure for failure recovery Group #3 Parameter (May be Used for Round #1):
Connection Failure Type, which includes three options: RLF, HOF, and CHOF.

Group #4 Parameter (May be Used for Round #2):
Number Of Preambles Sent in CHO recovery to indicate the number of preambles sent by MAC layer for the failed random access procedure in a CHO procedure for failure recovery in Round #2
Beam ID of a selected beam of a target cell associated with a failure in Round #1. The selected beam of the target cell is used for random access.

In some embodiments of the present application, the failure indication message includes a CHO cause. For example, the failure indication message is a RLF INDICATION message, and the CHO cause is included in Reestablishment Cause of the RLF INDICATION message.

For example, when a [Too Late Handover] event happens in some embodiments of the present application, if a CHO failure occurs in Round #1 in a cell of BS 1, the following steps are performed in two use cases in Scenario A below:
Case (a): a CHO failure occurs (Round #1); then, a CHO failure occurs in a CHO procedure (Round #2); and after that, a RRC re-establishment is successfully completed (Round #3).
Case (b): a CHO failure occurs (Round #1); and then, a RRC re-establishment is successfully completed.

In particular, in the embodiments of Case (a) and Case (b), a UE may access BS 2 by a RRC re-establishment; then, the UE may transmit UE information to BS 2. The UE information may include at least one of a RLF report and a RACH report. After that, BS 2 may transmit a failure indication message to BS 1.

The failure indication message transmitted from BS 2 to BS 1 may include at least one of the following new information:
New cause of CHO failure
  This cause may be included in Reestablishment Cause of a RLF INDICATION message.
  This cause is applicable for use cases that a UE performs a CHO procedure prior to an occurrence of the failure in Round #1
    Case (a) in Scenario A: a CHO failure occurs (Round #1); then, a CHO failure occurs in a CHO procedure (Round #2); and after that, a RRC re-establishment is performed.
    Case (b) in Scenario A: a CHO failure occurs (Round #1); and then, a RRC re-establishment is performed.
CHO cell ID for failure recovery
  The CHO cell ID for failure recovery may be PCI of the cell in which the UE performs a CHO handover after the failure happens in Round #1.
  BS 2 may include the CHO cell ID for failure recovery in the RLF INDICATION message, to indicate to BS 1 that a CHO procedure for failure recovery is performed before a RRC re-establishment.

Figure 6:
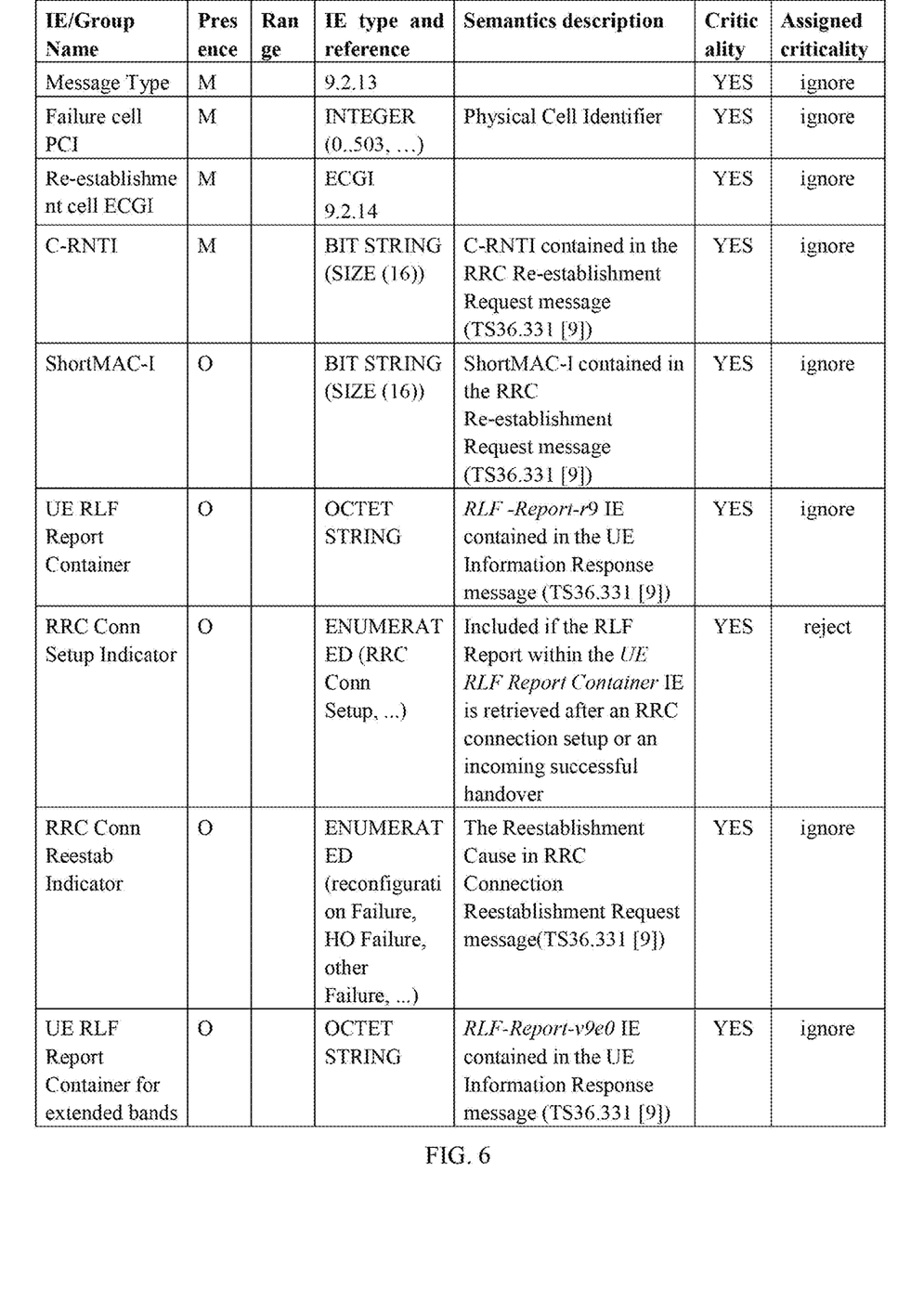
FIG. 6 illustrates an exemplary of a failure indication message in accordance with some embodiments of the present application.

FIG. 6 illustrates an exemplary of a failure indication message in accordance with some embodiments of the present application. The embodiments of FIG. 6 show information included in a RLF INDICATION message as defined in 3GPP TS36.423 and TS38.423.

As shown in FIG. 6, information for a RLF INDICATION message include the following IEs or Group Names:
Message Type
Failure Cell ID: PCI of the cell in which the UE was connected prior to the failure occurred;
Reestablishment Cell ID: ECGI of the cell where a RRC re-establishment attempt is made;
C-RNTI: C-RNTI of the UE in the cell where UE was connected prior to the failure occurred;
shortMAC-I (optionally): the 16 least significant bits of the MAC-I calculated using the security configuration of the source cell and the RRC re-establishment cell identity;
UE RLF Report Container (optionally): the RLF Report received from the UE, as specified in TS 36.331 [16];
Reestablishment Cause (optionally): provided by the UE during the RRC connection re-establishment attempt.

Figure 7:
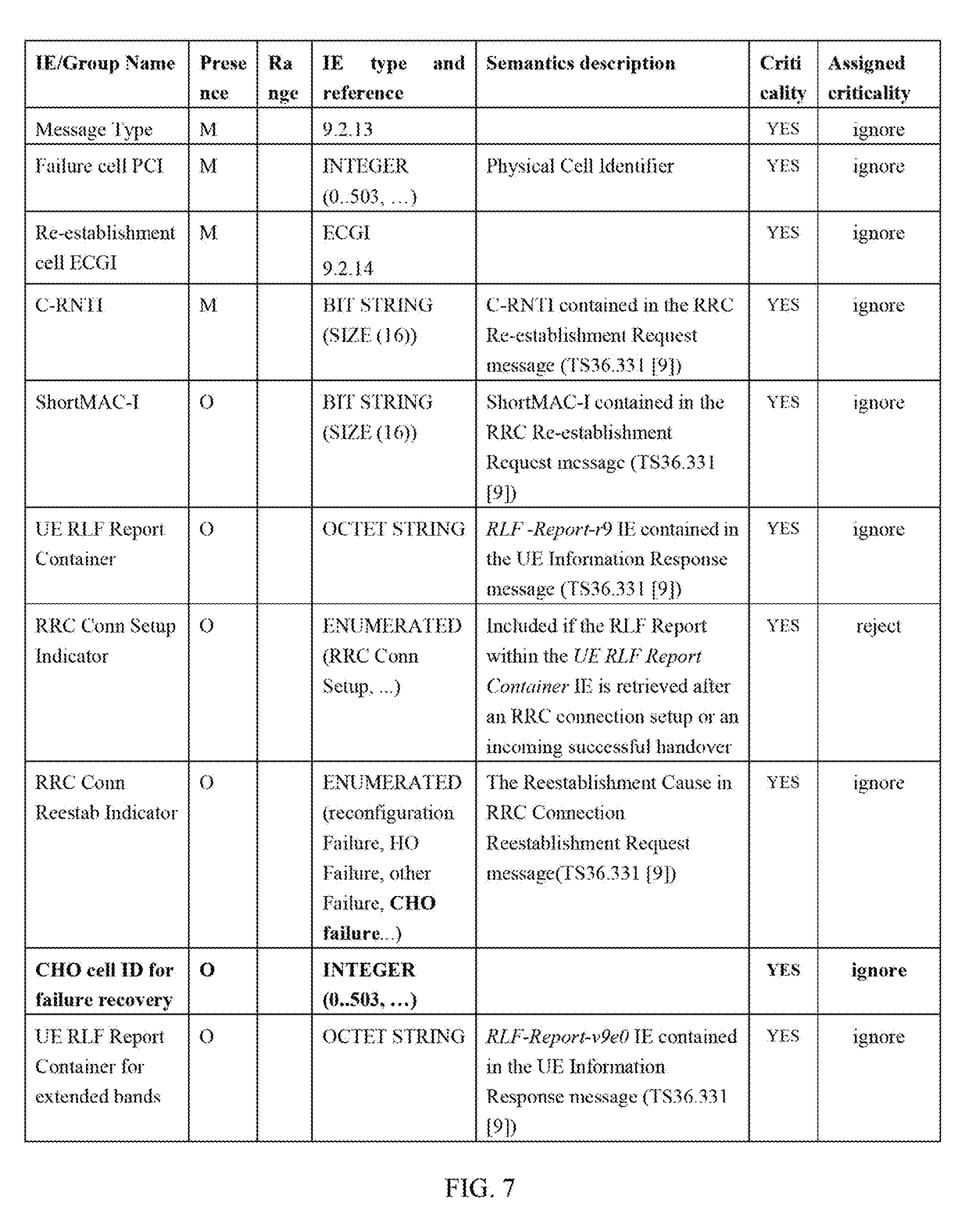
FIG. 7 illustrates a further exemplary of a failure indication message in accordance with some embodiments of the present application.

FIG. 7 illustrates a further exemplary of a failure indication message in accordance with some embodiments of the present application. The embodiments of FIG. 7 show new information that is included in a RLF INDICATION message.

As shown in FIG. 7, IEs or Group Names included in the RLF INDICATION message are similar to those in FIG. 6, except:
(1) The IE "RRC Conn Reestab Indicator": "CHO failure" is added to the IE type and reference of this IE.
(2) A new IE "CHO cell ID for failure recovery" and the corresponding contents are added to the penultimate line of the table shown in FIG. 7.

The embodiments of FIG. 7 correspond to the failure indication message in three failure events [Too Late Handover], [Too Early Handover], and [Handover to Wrong Cell] under Scenarios A, B, and C.

Figure 8:
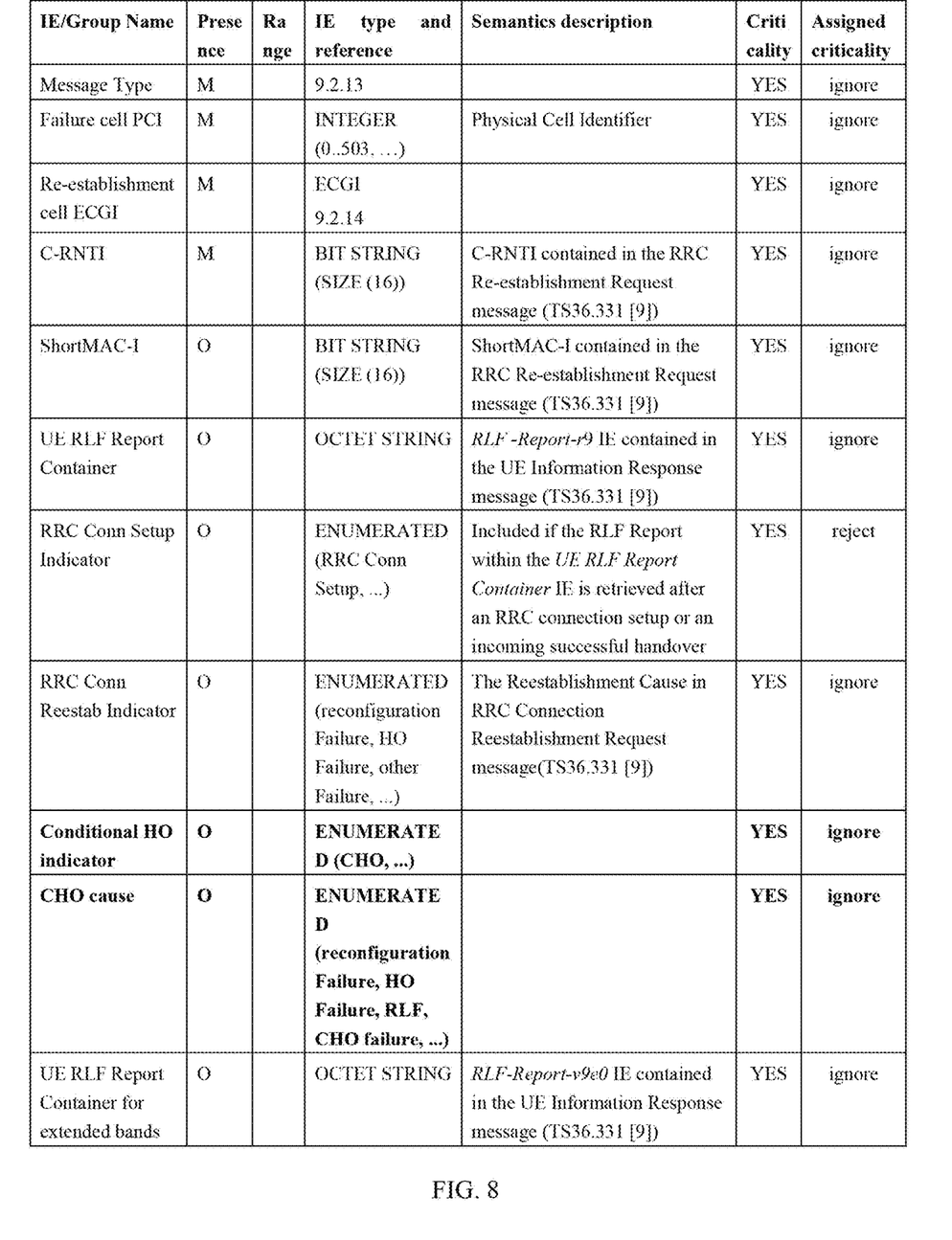
FIG. 8 illustrates an additional exemplary of a failure indication message in accordance with some embodiments of the present application.

FIG. 8 illustrates an additional exemplary of a failure indication message in accordance with some embodiments of the present application. The embodiments of FIG. 8 show new information that is included in a RLF INDICATION message.

As shown in FIG. 8, IEs or Group Names included in the RLF INDICATION message are similar to those in FIGS. 6 and 7, except:
(1) Anew IE "Conditional HO indicator" and the corresponding contents are added to the antepenultimate line of the table shown in FIG. 8. The IE type and reference of this IE may be enumerated as CHO and etc.
(2) A new IE "CHO cause" and the corresponding contents are added to the penultimate line of the table shown in FIG. 8. The IE type and reference of this IE may be enumerated as "reconfiguration Failure, HO Failure, RLF, CHO failure, and etc."

The embodiments of FIG. 8 correspond to the failure indication message in three failure events [Too Late Handover], [Too Early Handover], and [Handover to Wrong Cell] under Scenarios A, B, and C.

Figure 9:
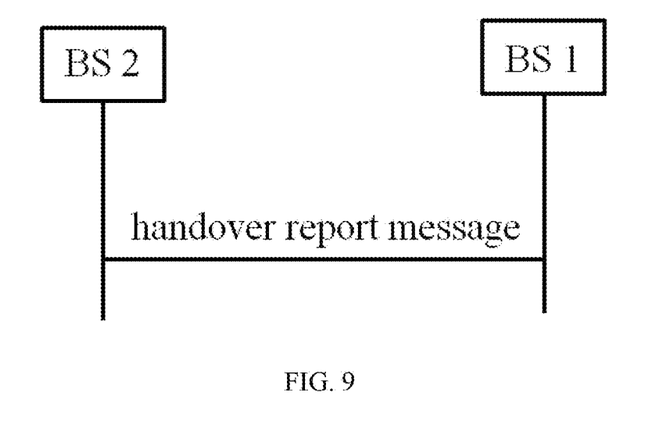
FIG. 9 illustrates another exemplary signal transmission procedure in accordance with some embodiments of the present application.

FIG. 9 illustrates another exemplary signal transmission procedure in accordance with some embodiments of the present application. The embodiments of FIG. 9 show a signal transmission procedure after the operation 402 of the exemplary method 400 as illustrated and shown in FIG. 4.

As shown in FIG. 9, BS 2 transmits a handover report message to BS 1. Similar to FIG. 5, BS 1 is a source BS which controls the original serving cell of a UE (e.g., UE 101a as illustrated and shown in FIG. 1), and BS 2 is a target BS which controls a target cell of the UE. The handover report message may be transmitted by Xn interface or X2 interface. The handover report message may be named as a HANDOVER REPORT message.

The purpose of transmitting the handover report message is to enable mobility robustness improvement in E-UTRAN. The handover report message may be used to pass information connected to analysis of a RLF which occurred shortly after a successful handover procedure. The Handover Report procedure may also be used to pass information connected to potential inter-RAT (Radio Access Technology) ping-pong cases.

Details described in all the foregoing embodiments of the present application (for example, how to handle a failure before or during a CHO procedure) are applicable for the embodiments as illustrated and shown in FIG. 9.

Figure 10:
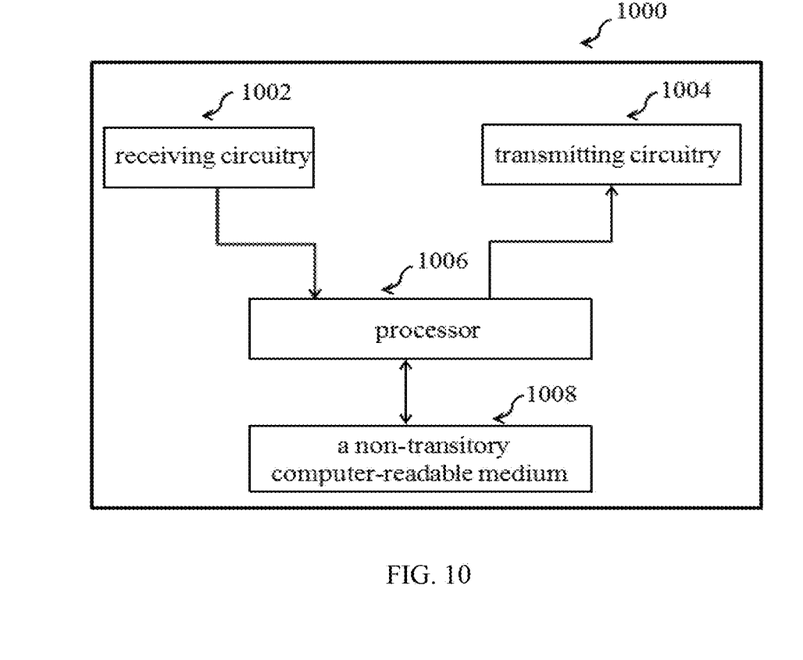
FIG. 10 illustrates a block diagram of an exemplary apparatus in accordance with some embodiments of the present application.

FIG. 10 illustrates a block diagram of an exemplary apparatus in accordance with some embodiments of the present application. Referring to FIG. 10, the apparatus 1000 includes a receiving circuitry 1002, a transmitting circuitry 1004, a processor 1006, and a non-transitory computer-readable medium 1008. The processor 1006 is coupled to the non-transitory computer-readable medium 1008, the receiving circuitry 1002, and the transmitting circuitry 1004.

It is contemplated that some components are omitted in FIG. 10 for simplicity. In some embodiments, the receiving circuitry 1002 and the transmitting circuitry 1004 may be integrated into a single component (e.g., a transceiver).

In some embodiments, the non-transitory computer-readable medium 1008 may have stored thereon computer-executable instructions to cause a processor to implement the operations with respect to UE(s) as described above. For example, upon execution of the computer-executable instructions stored in the non-transitory computer-readable medium 1008, the processor 1006 and the transmitting circuitry 1004 performs the method of FIG. 2, including: upon a failure associated with a serving cell of a BS, the processor 1006 performs a cell selection procedure to select a cell of another BS, wherein the failure is one of a RLF, a HO failure, and a CHO failure; if the selected cell of the abovementioned another BS is not associated with the CHO configuration, the processor 1006 performs a RRC re-establishment procedure; if the selected cell of the abovementioned another BS is associated with the CHO configuration, the processor 1006 performs a CHO procedure; upon another CHO failure during the CHO procedure, the processor 1006 performs a RRC re-establishment procedure; and after entering into a connected state with the abovementioned another BS, the transmitting circuitry 1004 transmits a RLF report to the abovementioned another BS, wherein the RLF report includes both information related to the failure and information related to the abovementioned another CHO failure.

In some embodiments, the non-transitory computer-readable medium 1008 may have stored thereon computer-executable instructions to cause a processor to implement the operations with respect to BS(s) as described above. For example, upon execution of the computer-executable instructions stored in the non-transitory computer-readable medium 1008, the processor 1006, the receiving circuitry 1002, and the transmitting circuitry 1004 perform the method of FIG. 4, including: the receiving circuitry 1002 receives a RLF report from a UE, wherein the RLF report includes information related to a CHO failure; and the transmitting circuitry 1004 transmits a failure indication message to another BS.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE), comprising:
   receiver circuitry;
   transmitter circuitry; and
   at least one processor coupled with at least one memory and configured to cause the UE to:
   perform, upon a first failure associated with a serving cell of a first base station (BS), a cell selection procedure to select a cell of a second BS, wherein the first failure is one of a radio link failure (RLF), a handover (HO) failure, or a first conditional handover (CHO) failure;

perform, in response to at least one CHO execution condition being satisfied for handover to the selected cell, a CHO procedure, wherein the selected cell is associated with a CHO configuration;

perform, upon a second CHO failure during the CHO procedure, a re-establishment procedure; and transmit, after entering into a connected state with the second BS, a RLF report to the second BS, wherein the RLF report includes both information related to the first failure and information related to the second CHO failure, and wherein, when the first failure is the first CHO failure, the information related to the first failure comprises at least one of:

a cell identifier (ID) of the serving cell of the first BS:

information of a CHO execution condition associated with the first CHO failure;

a beam ID of a selected beam of a target cell associated with the first failure, wherein the selected beam of the target cell is used for random access; or a failure type of the first failure.

2. The UE of claim 1, wherein the information of the CHO execution condition associated with the first CHO failure comprises at least one of:

a channel quality of the target cell associated with the first failure;

a channel quality of the serving cell associated with the first failure;

an offset between the channel quality of the serving cell and the channel quality of the target cell; or a first threshold associated with the serving cell and a second threshold associated with the target cell.

3. The UE of claim 2, wherein the channel quality is at least one of a reference signal received power (RSRP) or a reference signal received quality (RSRQ).

4. The UE of claim 1, wherein the UE is implementable to perform a first CHO procedure in the serving cell of the first BS prior to the first failure occurring.

5. The UE of claim 1, wherein the beam ID is a synchronization signal block (SSB) index or a channel state information reference signal (CSI RS) index.

6. The UE of claim 1, wherein the failure type of the first failure is one of a RLF failure type, a HO failure type, or a CHO failure type.

7. The UE of claim 1, wherein the information related to the second CHO failure comprises at least one of:

a cell ID of the selected cell of the second BS;

information of the at least one CHO execution condition associated with the second CHO failure;

a beam ID of a selected beam of a target cell of the second CHO failure, wherein the selected beam of the target cell is used for random access;

a beam quality of the selected beam of the target cell;

an execution condition indicator of the CHO procedure; or a total number of preambles sent associated with the CHO procedure.

8. The UE of claim 7, wherein the information of the at least one CHO execution condition associated with the second CHO failure comprises at least one of:

a channel quality of the target cell associated with the first failure;

a channel quality of the serving cell associated with the first failure;

an offset between the channel quality of the serving cell and the channel quality of the target cell; or a first threshold associated with the serving cell and a second threshold associated with the target cell.

9. The UE of claim 7, wherein the cell ID of the selected cell is one of a physical cell identifier (PCI) or an evolved universal terrestrial radio access (E-UTRAN) network cell global identifier (ECGI).

10. A first base station (BS), comprising:

receiver circuitry;

transmitter circuitry; and at least one processor coupled with at least one memory and configured to cause the first BS to:

receive a radio link failure (RLF) report from a user equipment (UE), wherein:

the RLF report includes both information related to a first failure and information related to a conditional handover (CHO) failure of a CHO procedure and wherein, when the first failure is the first CHO failure, the information related to a first failure comprises at least one of: a cell identifier (ID) of the serving cell of the first BS; information of a CHO execution condition associated with the first CHO failure; a beam ID of a selected beam of a target cell associated with the first failure, wherein the selected beam of the target cell is used for random access; or a failure type of the first failure, the CHO procedure is performed in response to at least one execution condition to be satisfied for execution of the CHO procedure, and the first failure is one of an RLF, a handover (HO) failure, or a second CHO failure; and transmit a failure indication message to a second BS.

11. The first BS of claim 10, wherein the failure indication message includes a container of the RLF report.

12. The first BS of claim 10, wherein the failure indication message includes a CHO cause.

13. The first BS of claim 12, wherein the failure indication message is an RLF INDICATION message, and wherein the CHO cause is included in Reestablishment Cause of the RLF INDICATION message.

14. The first BS of claim 10, wherein the failure indication message further includes a CHO cell ID for failure recovery, and the CHO cell ID represents an identifier of a cell in which the CHO failure occurs.

15. The first BS of claim 14, wherein the CHO cell ID is used to indicate to the first BS that the second CHO procedure for failure recovery is performed in the cell before re-establishment.

16. The first BS of claim 10, wherein the failure indication message includes a new information element (IE) of a CHO indicator, and the CHO indicator indicates that the second CHO procedure for failure recovery is successful.

17. The first BS of claim 16, wherein the failure indication message is an RLF INDICATION message.

18. A method performed by a user equipment (UE), the method comprising:

performing, upon a first failure associated with a serving cell of a first base station (BS), a cell selection procedure to select a cell of a second BS, wherein the first failure is one of a radio link failure (RLF), a handover (HO) failure, or a first conditional handover (CHO) failure;

performing, in response to at least one CHO execution condition being satisfied for handover to the selected cell, a CHO procedure, wherein the selected cell is associated with a CHO configuration;

performing, upon a second CHO failure during the CHO procedure, a re-establishment procedure; and transmitting, after entering into a connected state with the second BS, a RLF report to the second BS, wherein the RLF report includes both information related to the first failure and information related to the second CHO failure, and wherein, when the first failure is the first CHO failure, the information related to the first failure comprises at least one of:

a cell identifier (ID) of the serving cell of the first BS;

information of a CHO execution condition associated with the first CHO failure;

a beam ID of a selected beam of a target cell associated with the first failure, wherein the selected beam of the target cell is used for random access; or a failure type of the first failure.

19. A user equipment (UE) processor for wireless communication, comprising:

a receiving circuit;

a transmitting circuit;

at least one memory; and at least one processor coupled with the receiving circuit, the transmitting circuit, and the at least one memory, wherein the at least one processor is configured to cause the UE to:

perform, upon a first failure associated with a serving cell of a first base station (BS), a cell selection procedure to select a cell of a second BS, wherein the first failure is one of a radio link failure (RLF), a handover (HO) failure, or a first conditional handover (CHO) failure;

perform, in response to at least one CHO execution condition being satisfied for handover to the selected cell, a CHO procedure, wherein the selected cell is associated with a CHO configuration;

perform, upon a second CHO failure during the CHO procedure, a re-establishment procedure; and transmit, after entering into a connected state with the second BS, a RLF report to the second BS, wherein the RLF report includes both information related to the first failure and information related to the second CHO failure, and wherein, when the first failure is the first CHO failure, the information related to the first failure comprises at least one of:

a cell identifier (ID) of the serving cell of the first BS;

information of a CHO execution condition associated with the first CHO failure;

a beam ID of a selected beam of a target cell associated with the first failure, wherein the selected beam of the target cell is used for random access; or a failure type of the first failure.

* * * * *